(12) United States Patent
Farmer (10) Patent No.: US 11,096,343 B1
(45) Date of Patent: Aug. 24, 2021

(54) HYDROPONIC APPARATUS

(71) Applicant: Bace Australia Pty Ltd, Melbourne (AU)

(72) Inventor: Toby Farmer, Melbourne (AU)

(73) Assignee: BACE AUSTRALIA PTY LTD, Melbourne (AU)

( * ) Notice: Subject to any disclaimer, the term of this patent is extended or adjusted under 35 U.S.C. 154(b) by 0 days.

(21) Appl. No.: 16/981,882

(22) PCT Filed: Feb. 20, 2020

(86) PCT No.: PCT/AU2020/050143
§ 371 (c)(1),
(2) Date: Sep. 17, 2020

(87) PCT Pub. No.: WO2020/210860
PCT Pub. Date: Oct. 22, 2020

(30) Foreign Application Priority Data

Apr. 16, 2019 (AU) .................... 2019901308

(51) Int. Cl.
| | | |
|---|---|---|
| *A01G 31/04* | (2006.01) | |
| *A01G 7/04* | (2006.01) | |
| *G05B 13/02* | (2006.01) | |
| *H04N 5/232* | (2006.01) | |
| *H04N 5/265* | (2006.01) | |
| *G06T 7/00* | (2017.01) | |
| *H04N 7/18* | (2006.01) | |
| *A01G 31/02* | (2006.01) | |
| *A01G 31/00* | (2018.01) | |

(Continued)

(52) U.S. Cl.
CPC ........... *A01G 31/047* (2013.01); *A01G 7/045* (2013.01); *A01G 9/0293* (2018.02); *A01G 27/003* (2013.01); *A01G 31/00* (2013.01); *A01G 31/02* (2013.01); *G05B 13/0265* (2013.01); *G06T 7/0012* (2013.01); *H04N 5/2257* (2013.01); *H04N 5/23238* (2013.01); *H04N 5/265* (2013.01); *H04N 7/183* (2013.01); *G06T 2207/20081* (2013.01)

(58) Field of Classification Search
CPC ...... A01K 31/047; A01K 31/06; A01K 31/00; A01K 2031/006; A01K 31/02; A01K 31/04
See application file for complete search history.

(56) References Cited

U.S. PATENT DOCUMENTS

| | | |
|---|---|---|
| 5,862,628 A | 1/1999 | Takashima |
| 6,604,321 B2 | 8/2003 | Marchildon |
| | (Continued) | |

OTHER PUBLICATIONS

International Search Report dated May 22, 2020 from PCT Application No. PCT/AU2020/050143.

*Primary Examiner* — Kristen C Hayes
(74) *Attorney, Agent, or Firm* — Innovation Capital Law Group, LLP; Vic Lin (57) ABSTRACT

Hydroponic apparatus has a rotary drum rotatably supported at one end from a bearing of a support stand and is accessibly open at an opposite open end by a removeable cover plate. A drive to rotates the rotary drum about the bearing. The rotary drum defines an annular watering tank therein and is configured for holding a plurality of plants within an interior thereof in use to be watered by the watering tank. An axial lamp is located within the drum to illuminate plants therein.

27 Claims, 7 Drawing Sheets

(51) Int. Cl.
*A01G 9/029* (2018.01)
*A01G 27/00* (2006.01)
*H04N 5/225* (2006.01)

(56) References Cited

U.S. PATENT DOCUMENTS

| | | | | |
|---|---|---|---|---|
| 7,134,240 | B1 * | 11/2006 | Neal | A01G 31/02 |
| | | | | 47/60 |
| 7,181,886 | B2 * | 2/2007 | Bourgoin | A01G 31/047 |
| | | | | 47/62 A |
| 9,730,400 | B2 * | 8/2017 | Wilson | A01G 31/047 |
| 2002/0144461 | A1 | 10/2002 | Marchildon | |
| 2004/0060491 | A1 | 4/2004 | Leduc et al. | |
| 2005/0055878 | A1 * | 3/2005 | Dumont | A01G 31/047 |
| | | | | 47/62 R |
| 2011/0232190 | A1 | 9/2011 | Pindus et al. | |
| 2016/0360711 | A1 | 12/2016 | Vesty | |
| 2017/0055472 | A1 * | 3/2017 | Gunther | A01G 31/047 |
| 2017/0105371 | A1 * | 4/2017 | Cleveland | A01G 31/047 |

\* cited by examiner

HYDROPONIC APPARATUS

FIELD OF THE INVENTION

This invention relates generally to hydroponic apparatus.

BACKGROUND OF THE INVENTION

Hydroponic apparatus of various configurations exist including that which is disclosed in U.S. Pat. No. 6,604,321 B2 (Marchildon, 2002) which teaches rotary plant growing apparatus which has an open-ended cylindrical drum which rotates about a horizontal axis on a support stand. According to Marchildon, a lamp is positioned at the axis of the drum and holes in the drum hold plant pots, with the plants facing the light and the bottom of the pots extending radially outward from the drum. A tray under the drum holds a pool of water and is spaced from the drum such that the lower part of the pots contacts the water as the drum rotates, watering the plants. The apparatus is particularly suitable for hydroponic gardening.

The present invention seeks to provide hydroponic apparatus, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein hydroponic apparatus comprising a rotary drum rotatably supported at one end from a bearing of a support stand in being accessibly open at an opposite open end by a removable cover plate. A drive rotates the rotary drum about the bearing.

An axial lamp is located within the drum. Furthermore, the rotary drum defines an annular watering tank therein and is configured for holding a plurality of plants within an interior thereof in use to be watered by the watering tank whilst the plants are illuminated by the axial lamp.

As such, the present apparatus is especially suited for interior use such as atop a kitchen counter the growing of herbs, office desks and the like.

The watering tank can be replenished from a supply hose and water reservoir of the support stand. The support stand may comprise multiple reservoirs additionally for liquid nutrient and the apparatus may comprise a controller configured for automated watering and nutrient dosing, including depending on the type of plant planted within the apparatus or in accordance with water quality sensor readings.

The apparatus may comprise an annular insert insertable within the drum and having a plurality of pockets for holding seedpods. Each seedpod may comprise a fibrous material having seeds therein. The pocket may have an interior of greater cross-section than that of an entrance thereof and each seedpod may have a greater cross-section than that of the entrance such that the seedpods are held within the interior of the pocket including when inverted within the drum. The seedpods may come pre-packaged in an enclosure having a removable cover and which may click into a pocket.

The apparatus may comprise a controller and the controller may be configured for controlling the operation of the apparatus according to different interior growing regions within the drum.

For example, the axial lamp may comprise a plurality of longitudinal lighting arrays and the controller may be configured for controlling the longitudinal lighting arrays to vary the light at different interior regions of the drum.

The axial lamp may remain static with respect to the radial drum and the apparatus may comprise a rotational transducer to detect the rotational orientation of the drum with respect to the radial lamp such that the controller controls the lighting array is depending on the rotational orientation of the drum with respect to the axial lamp to vary the light at the different growing regions.

Furthermore, the annular water tank may be defined between exterior and interior surface of the drum such that water therein pools at a lowermost region thereof such that the plants within the drum periodically come into contact with the water at the lowermost region. As such, the controller may be configured for variably controlling the rate of rotation of the drum to control the dwell time of the different interior growing regions at the lowermost region vary the amount of watering of each different interior growing region.

As such, in accordance with these embodiments, the controller may be configured for adjusting the light and/or watering of different types of plants within the drum.

The controller may be programmed with a plant type (such as basil, parsley, coriander or the like) according to the different interior growing regions and the controller may access a database of growing requirements of the different types of plants so as to be able to control the lighting and a watering accordingly.

In embodiments, pockets of the annular insert may be define the different growing regions. In one manner, the annular insert can only be inserted into the drum at a particular orientation such that the controller is able to determine the growing regions of the annular insert with respect to the orientation of the drum. In alternative embodiments, the annular insert is configured for detecting the orientation of the annular insert with respect to the drum. As such, in accordance with instructions on the annular insert, a user may be able to insert different types of seedpods (such as basil, coriander and parsley) seedpods such that the controller automatically control the lighting at a watering thereof appropriately. Alternatively, the in all insert may complete packaged with different types of seedpods.

In alternative embodiments, each seedpod or annular insert pocket may comprise a computer readable media (such as an RFID, NFC tag or the like) which is read by a reader of the controller at various rotational positions. As such, the controller may be configured for detecting a plant-type within each pocket of the annular insert or the growing region and controlling at least one of the lighting and/or watering accordingly.

The apparatus may comprise proximally sensors arranged along the axial lamp to detect when the plants have grown too high wherein an alert may be sent to an associated mobile communication device.

The apparatus may comprise interior image sensors for generating an interior view of the drum which may be displayed on an associated mobile communication device. The apparatus may capture image data from the image sensors in sequence and stitched together the image data to form a 360° view of the interior of the drum.

Furthermore, the apparatus may comprise plant health sensor and/or water quality sensors for determining plant health and water quality respectively which may similarly be displayed on an associated mobile communication device. In embodiment, the apparatus may perform image analysis on image data obtained from the image sensors to determine plant health.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
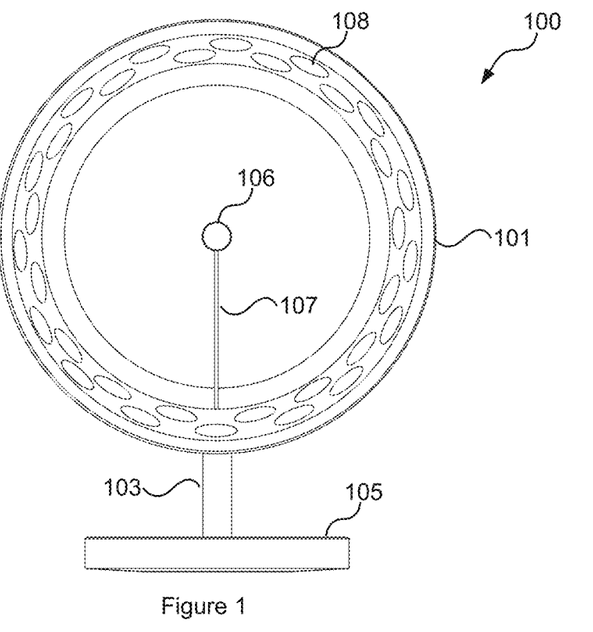
FIG. 1 shows a front elevation view of hydroponic growing apparatus in accordance with an embodiment.
Figure 2:
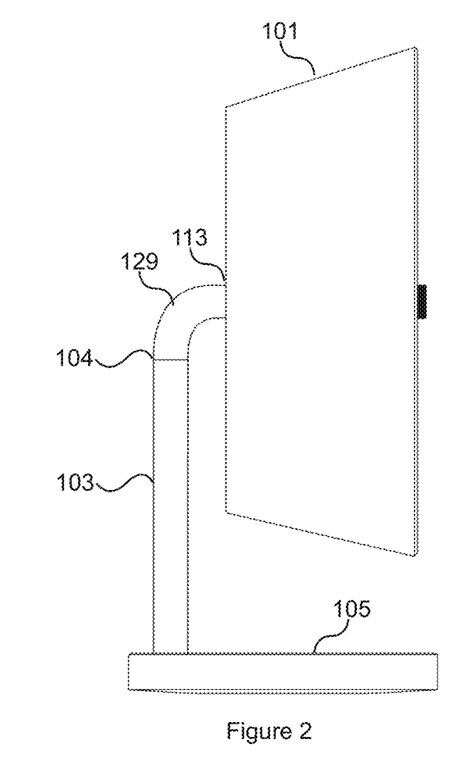
FIG. 2 shows a side elevation view of the apparatus.
Figure 3:
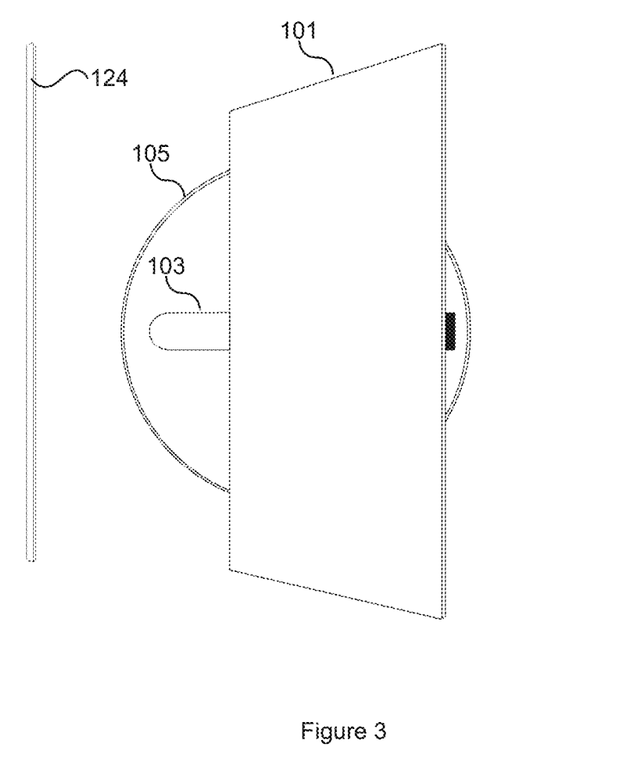
FIG. 3 shows a top plan view of the apparatus.
Figure 4:
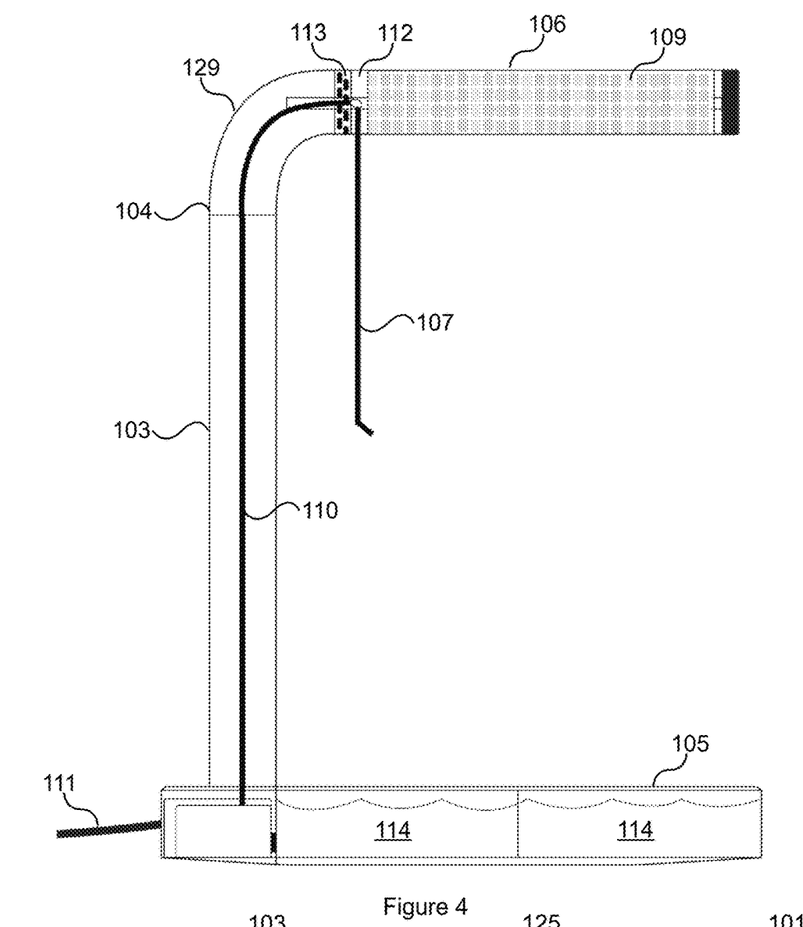
FIG. 4 shows a side elevation view of the apparatus without the rotary drum thereof.

FIG. 1 shows a front elevation view of hydroponic apparatus 100. FIG. 2 shows a side elevation view and FIG. 3 shows a top plan view of the apparatus 100.

The apparatus 100 comprises a rotary drum 101 rotatably supported at one end only from a bearing 113 of a support stand and being accessibly open at an opposite end. The apparatus 100 further comprises a drive to rotate the rotary drum 101 about the bearing 113.

Figure 6:
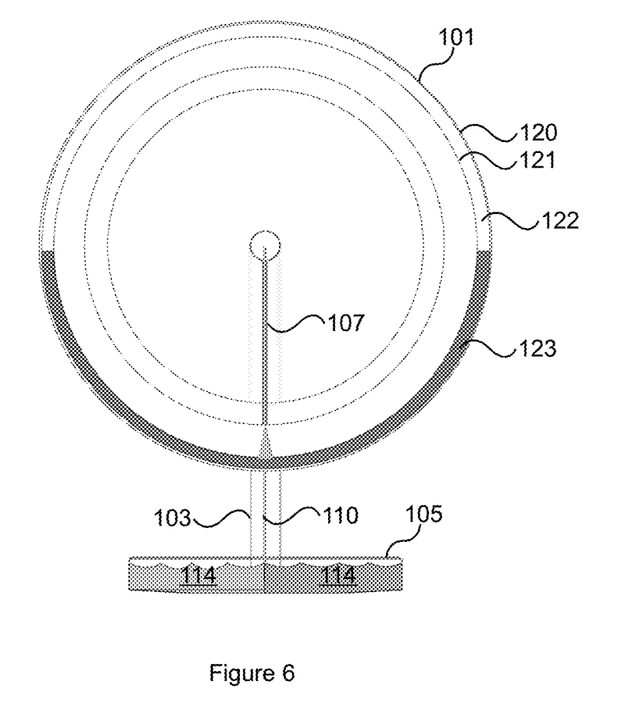
FIG. 6 illustrates liquid levels with reference to a front elevation view of the apparatus in accordance with an embodiment.

With reference to FIG. 6, the rotary drum 101 defines an annular watering tank 122 therein which contains liquid replenishment 123. The rotary drum 101 is configured for radially engaging a plurality of plants within an interior thereof in fluid contact with the liquid replenishment 123 of the reservoir 122. The apparatus 100 further comprises a replenishment supply hose 110 to replenish the reservoir tank 122 from the support stand.

With reference to FIG. 2, the support stand may comprise a base 105, a vertical stem 103 extending perpendicularly therefrom and an elbow 129 supporting the bearing 113. A swivel joint 104 may interface the stem 103 and the elbow 129.

With reference to FIG. 6, the rotary drum 101 may comprise an outer layer 120 and an inner layer 121 defining the reservoir tank 122 therebetween. The supply hose 110 may couple to the hose extension 107 which reaches between the outer layer 120 and the inner layer 121 to inject liquid therebetween.

With reference to FIG. 1, the interior of the rotary drum 101 may comprise a plurality of apertures 108. In embodiments, plastic sheeting may overlay these apertures 101 and plant roots punched therethrough to access the reservoir tank 123.

With reference to FIG. 1, the apparatus 100 comprises an axial lamp 106 to radially illuminate the radially retained plants within the rotary drum 101.

With reference to FIGS. 1-3, in an embodiment, the rotary drum 101 is frustoconical having an end wall coupled to the bearing 113 and an accessible opening of greater diameter at an opposite end thereof. The radially retained plants may be accessed and maintained via the opening.

With reference to FIG. 2, in embodiments, the apparatus 100 may comprise a translucent cover plate 124 which may cover the opening. The cover plate 124 may couple to the rotary drum 101 by way of magnetic couplings 147 in embodiments. In embodiments, the cover plate 124 may attenuate the light emanating from the lamp 106 by approximately 40% or more.

Figure 7:
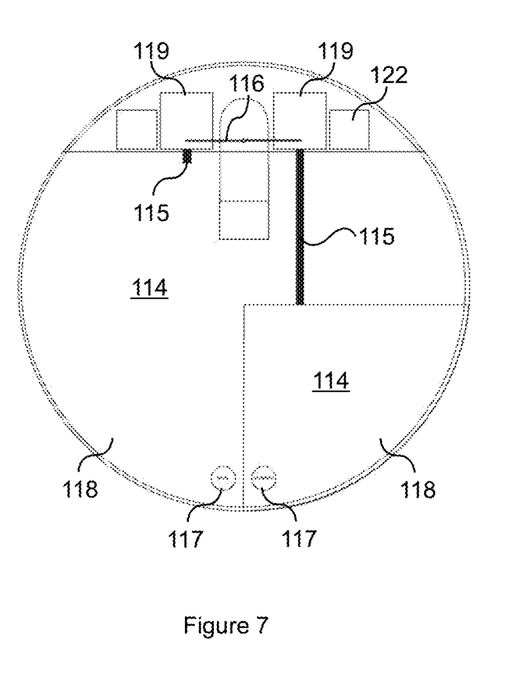
FIG. 7 shows a top plan controller schematic in accordance with an embodiment.

With reference to FIGS. 4-7, the base 105 of the support stand may comprise at least one fluid tight compartment 114 therein. With reference to FIG. 7, the apparatus 100 may comprise a plurality of compartments 114. The compartments 114 may comprise, for example, a major compartment 114 for holding water therein and a minor compartment 114 for holding liquid nutrient therein. The apparatus 100 may comprise pumps 119 and draw hoses 115 to draw water and liquid nutrient from the respective compartments. The pump 119 may pump via connector hose 116 to the supply hose 110 such that water and/or nutrient fill the reservoir 122.

Each compartment 114 may comprise a removable lid 118 for access for refills. Each lid 118 may be released via a respective pushbutton 117.

The apparatus 100 may comprise battery supply and electronic control componentry 122 for controlling the operation of the apparatus 100 including the supply pumps 119, the axial lamp 106 and the like.

In embodiments, the apparatus may comprise a humidifier (such as a piezoelectric exciter) which vaporises water from the compartment 119 and which is expelled via vent 112 in from the bearing 113 to humidify an interior of the rotary drum 101.

Figure 5:
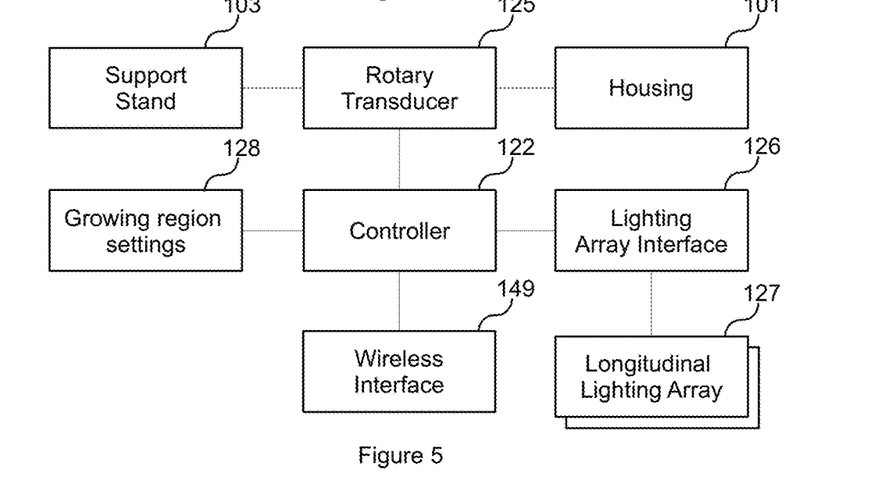
FIG. 5 shows an exemplary control system of the apparatus in accordance with an embodiment.

FIG. 5 shows an exemplary schematic of control system of the apparatus 100 in accordance with an embodiment. The control system may comprise a controller 122 comprising a processor for processing digital data. The processor may take the form of a low-power computing device such as an FPGA device. In operable communication with the processor is a memory device configured for storing digital data including computer program code instructions. In use, the processor fetches these computer program code instructions and associated data from the memory device for interpretation and execution for controlling the functionality of the apparatus 100.

In embodiments, the axial lamp 106 may comprise a matrix of LEDs 109.

Furthermore, with reference to FIG. 5, these LEDs 109 may be individually controllable in a plurality of longitudinal lighting arrays 127 via a lighting array interface 126. The controller 122 may be able to adjust at least one of the operation, intensity and colour temperature of each of the longitudinal lighting arrays 127 so as to be able to radially differentially illuminate an interior of the rotary drum 101. Intensity may be controlled by the controller 112 by time division multiplexing.

In this regard, the interior of the rotary drum 101 may be controllable by growing region (such as by quadrant or other division) and plants of differing types may be planted within each region. The memory device may comprise region settings 128 for each growing region. The rotary transducer 125 may interface the support stand 103 and the rotary drum 101 to ascertain the rotational position of the rotary drum such that the controller 122 is able to control respectively orientated longitudinal lighting arrays 127 to appropriately illuminate each growing region according to the growing region settings 128.

For example, a type of plant favouring direct sunlight may be planted within a first region and another type of plant favouring shaded light planted within a second region. As such, as the rotary drum 101 rotates with respect to the axial lamp 106 and whereas the axial lamp 106 remain static with respect to the rotary drum 101, the controller 122 is able to ascertain the rotational offset of the rotary drum 101 with respect to the support stand so as to be able to control individual longitudinal lighting arrays (each having one or more rows of LEDs) to illuminate the first region with high intensity light and the second region with low intensity light.

In alternative embodiments, the axial lamp 106 rotates with the rotary drum 101. In accordance with this embodiment, the controller 102 may yet be able to control individual longitudinal lighting arrays 127 so as to be able to differentially illuminate differing growing region with an interior of the rotary drum 101.

In embodiments, the apparatus may comprise a wireless interface 149 (such as a Wi-Fi or Bluetooth wireless interface) so as to interface with a mobile communication device such as one comprising a software application executing thereon for the control of the apparatus 100.

As such, the software application may be used to remotely control the operation of the apparatus 100 and view various readings thereof.

For example, the software application may be able to control the operation of the apparatus, control aspects of watering and of the operation of the axial lamp 106. The software application may also display various readings such as liquid levels of the base 105 and the reservoir tank 122, including individual liquid levels for each compartment 114.

In embodiments, the software application may also be used for configuring the growing regions.

In embodiments, the software application may comprise an interface allowing the user to specify the type of plant planted within each growing region. For example, for the available growing regions, the user may select from various types of common plants such as basil, parsley, coriander and the like. In embodiments, the software application may comprise the growing region settings 128 (or the software application may retrieve such from a server across the Internet) for each of the user-specified types of plants.

As such, should the user specify that the rotary drum has been planted with basil, parsley and coriander, the software application is able to automatically retrieve the growing region settings 128 for these types of plants so as to be able to individually control the longitudinal lighting arrays 127 to appropriately illuminate each of these different types of plants according to the known requirements thereof.

In embodiments, the controller 122 may further control the rotation of the rotational drum 101 to adjust watering of different types of plants. For example, a first growing region may comprise a first type of plant requiring less water and a second type of plant planted within a second growing region. As such, the controller 122 may slow the rotation of the rotary drum 121 when the second growing region is at the bottom of the rotary cycle such that the liquid 123 pooled within the reservoir tank 122 at that region dwells for longer at the second growing region as compared to the first growing region.

Figure 8:
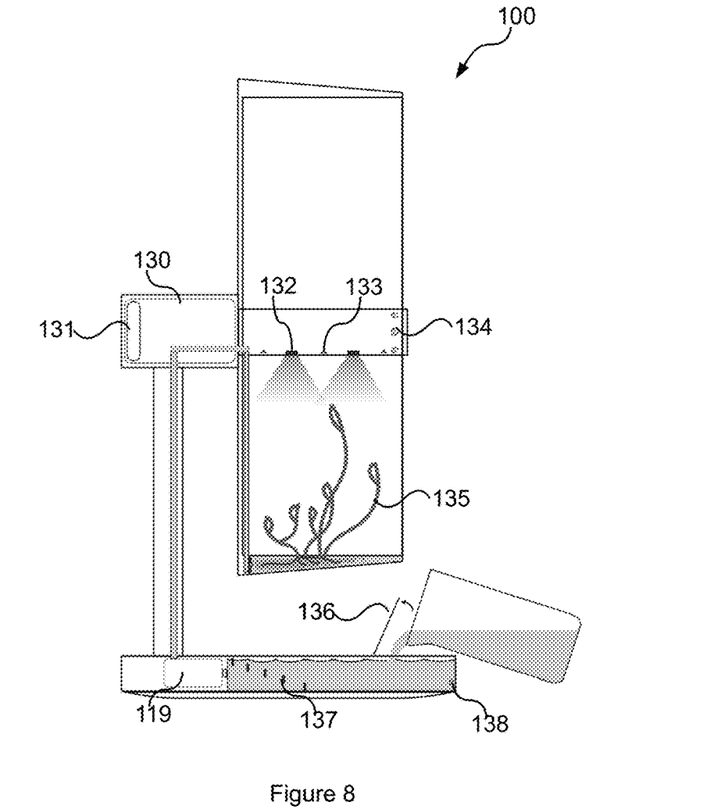
FIG. 8 shows a side cross-sectional elevation view of the apparatus in accordance with an embodiment.

FIG. 8 shows an embodiment wherein the rotary drum 101 is axially inverted as compared to the embodiment shown in FIG. 1 wherein the narrower diameter end of the drum 101 faces outwardly.

The apparatus 100 may comprise a motor 130 and motor controller 131 for rotating the drum 101.

Figure 9:
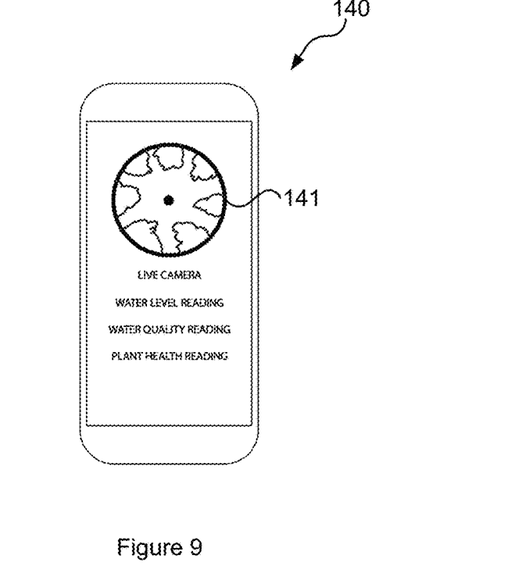
FIG. 9 shows a user interface of a mobile communication device in accordance with an embodiment.

FIG. 9 shows a mobile communication device 101 in operable communication with the apparatus across the wireless interface 149.

The apparatus 100 may comprise at least one proximity sensor 133 arranged along the axial lamp 106 for detecting proximity of the plants 135 growing therein. As such, the proximity sensor 133 may be configured for detecting when a plant 135 grows too tall and comes close to or touches the axial lamp 106. When detecting that a plant 135 has grown too tall or is touching the axial lamp 106, an alert may be generated by the connected mobile can medication device 140 accordingly.

A distal end of the axial lamp may comprise LEDs, or a small form factor digital display thereon for displaying various information. Furthermore, the distal end of the excellent may comprise touch sensors, pushbuttons or the like for controlling various aspects of the operation of the apparatus 100.

The apparatus 100 may comprise an infrared sensor 132 for monitoring plant growth. Readings from the infrared sensor 132 may, in conjunction with other sensor readings such as, dioxide levels, water consumption and the like, be used to determine plant health. In embodiments, the axial lamp may comprise far-red and infrared diodes to enhance photosynthesis of the plants 135 to improve plant health and taste.

The apparatus 100 may comprise at least one image sensor 134 for capturing image data of the interior of the drum 101. In embodiments, image data obtained from the image sensor 134 may be processed, including using machine learning techniques to further deduce the health of the plants 135 therein.

The image sensor 134 may comprise wide-angle cameras to capture wide-angle imagery within the interior of the drum 101. In embodiments, the image sensors 134 are configured so as to be able to view the entirety of the interior of the drum 101. However, in alternative embodiments, the at least one image sensor 134 captures image data in sequence as the drum 101 rotates which are thereby stitched together to form 360° image of the interior of the drum 101.

The interface of the mobile communication device 140 may comprise a 360° live view 141 of the interior of the drum.

The interface may further display additional information derived from various sensors of the apparatus 100, including for displaying water level readings, water quality readings, plant health readings and the like.

With reference to FIG. 8, the apparatus 100 may comprise water level sensors 137. In the embodiment shown in FIG. 8, the water level sensors 137 comprise a plurality of discrete electrical water contact sensors arranged across the depth of the fluid tight compartment 114 so as to be able to determine the level of water and/or liquid nutrient therein.

When detecting that the water level within the fluid tight compartment 114 is low or entity, the mobile communication device 140 may generate an alert accordingly.

A door 136 may be opened to replenish the water or liquid nutrient level.

In embodiments, the apparatus 100 or mobile communication device 140 is configured for estimating water usage using the level sensors 137 and predicting the amount of water remaining before replenishment is required.

The apparatus 100 may comprise further water quality sensors 138, including total dissolved solids (TDS), pH, salinity, temperature sensors and the like. As such, the interface of the mobile communication device 140 may display water quality readings using the water quality sensors 138.

Figure 10:
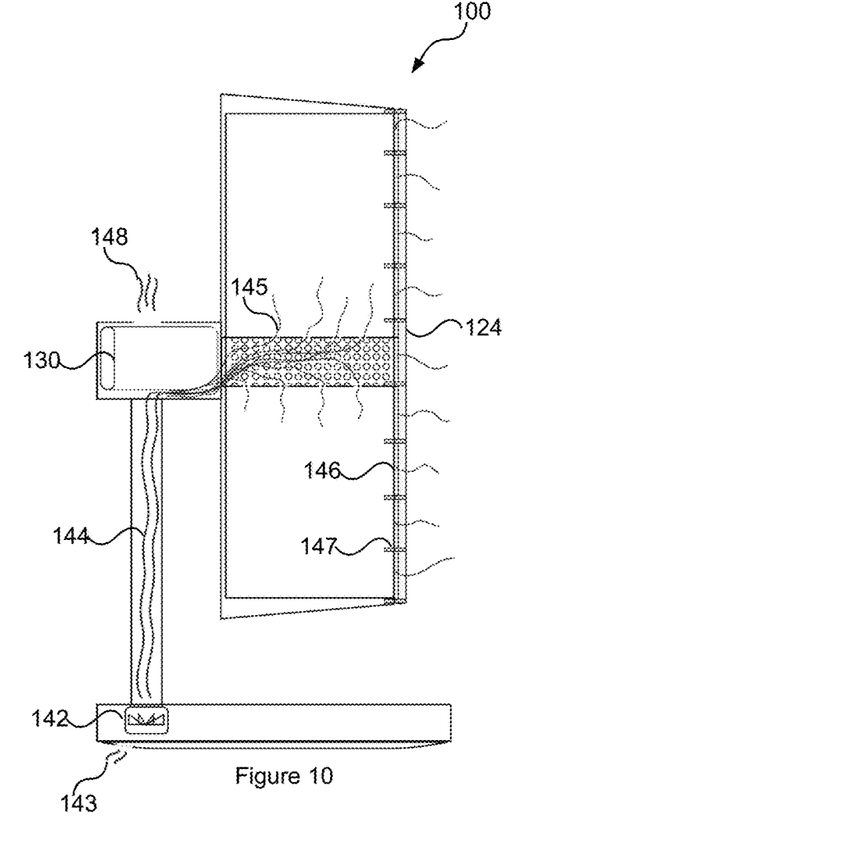
FIG. 10 shows a side cross-sectional elevation view of the apparatus in accordance with an embodiment.

FIG. 10 illustrates a ventilation system of the apparatus 100 wherein the apparatus 100 may comprise an impeller 142 such as one located within the base 105. The impeller may draw in air via an inlet 143 and upper central conduit 144 of the stand 103. The air may surround the motor 130 for cooling and may escape via an outlet 140 at the motor 130.

The air may enter the drum 101 and escape via apertures 145 therein, including along the axial lamp 106. The cover plate 124 may comprise apertures 146 therethrough or at the peripheral edge thereof to allow the air to escape.

FIG. 10 further shows the magnetic couplings 147 allowing for magnetic snap fit attachment of the cover 124 to the drum 101.

Figure 11:
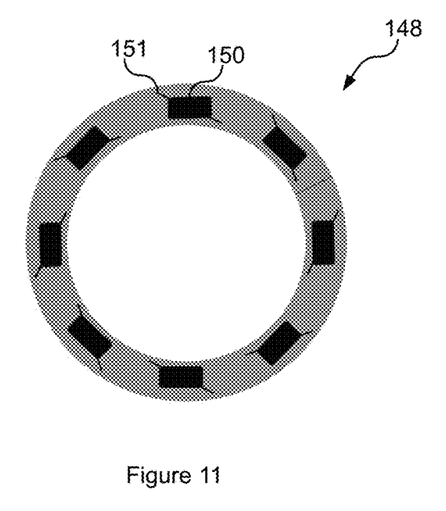
FIGS. 11 and 12 show annular insert for loading seedpods into the drum of the apparatus in accordance with an embodiment.
Figure 12:
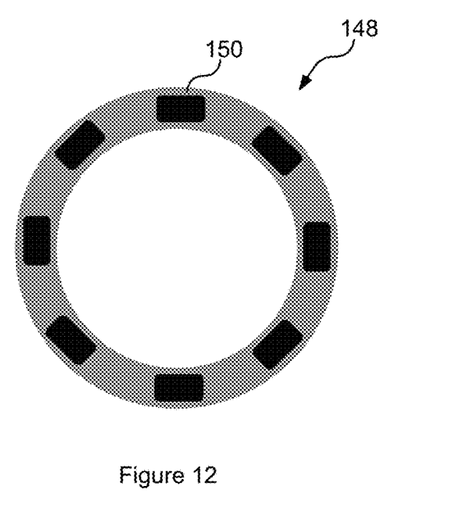

FIGS. 11 and 12 show an annular seed pod holding insert 148 for loading seedpods into the drum 101.

The annular insert 148 comprises a plurality of pockets 150 into which seedpods may be inserted. The embodiment of FIG. 11 has the annular insert 148 comprising flexible material such as foam and wherein the pockets 150 may comprise adjacent slits 151 for expansion. FIG. 12 has the annular insert 148 comprising more rigid plastic.

Figure 13:
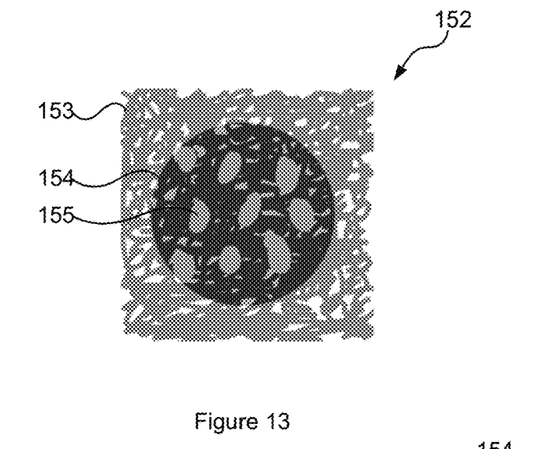
FIGS. 13-19 show various forms of seedpod in accordance with embodiments.
Figure 14:
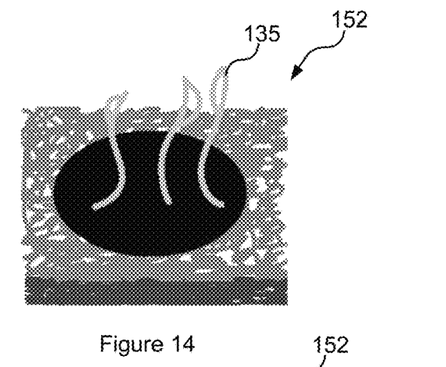

FIG. 13 shows a preformed seed pod 152 comprising a fibrous material 153 having a plurality of seeds 155 therein. A covering 154 such as a dark sticker may cover the seeds 155. In the manner shown in FIG. 14, the plants 135 may grow through the covering 154.

Figure 15:
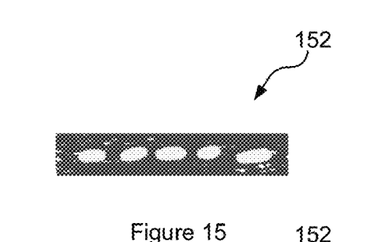
Figure 16:
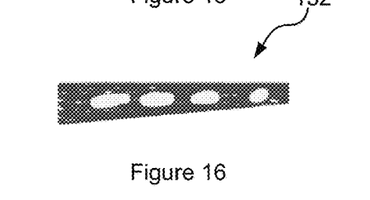

FIG. 15 shows an embodiment wherein the seed pod 152 is uniform in cross-section and FIG. 16 shows an embodiment wherein the seed pod 152 is wedge-shaped so as to conform with the frustoconically shaped drum 101.

Figure 17:
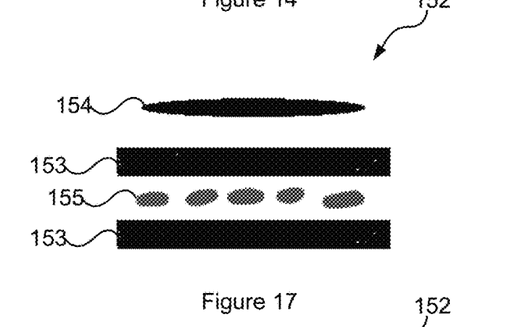
Figure 18:
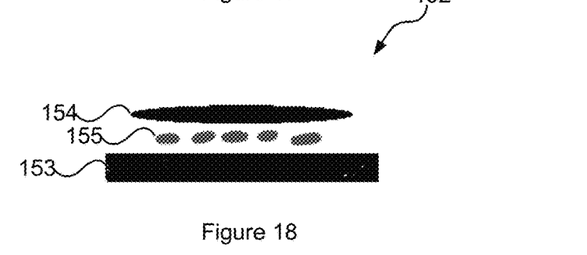

FIG. 17 shows an embodiment wherein the seed pod 152 comprises fibrous material either side of the seeds 151 and FIG. 18 shows an embodiment wherein the seeds 155 are held against a base fibrous layer 153 by the covering 154.

Figure 19:
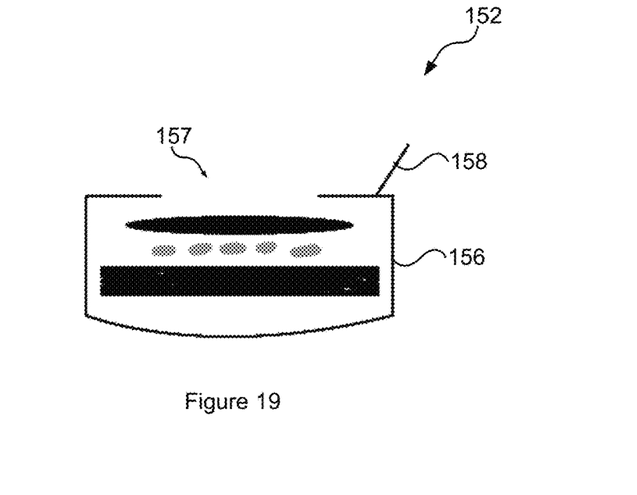

FIG. 19 shows a prepackaged seed pod held within a plastic enclosure 156 and having a plastic pull tab 158 which may be pull therefrom to reveal an opening 157 through which the plants 135 may grow. The plastic enclosure 156 may be inserted as is once the pull tab has been removed into the pockets of the annular insert 148. The enclosure 156 may comprise a rounded base. The enclosure 156 may comprise apertures therethrough, including through the base thereof to allow water to seep into the seed pod 152 therein.

Figure 20A:
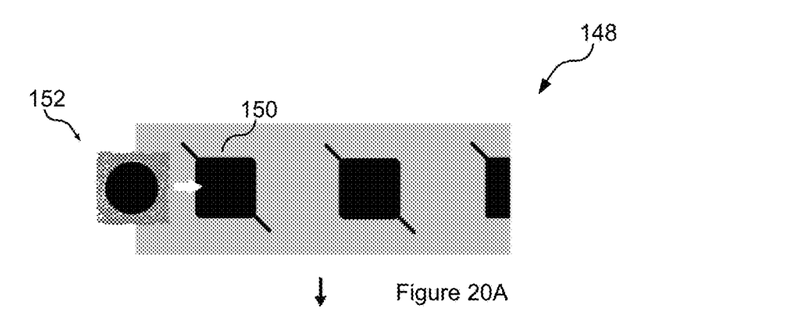
FIG. 20A-C illustrate the loading of a seedpod into a pocket of the annular insert in accordance with an embodiment.
Figure 20B:
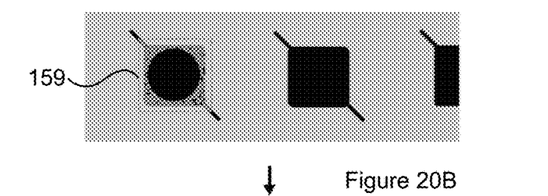
Figure 20C:
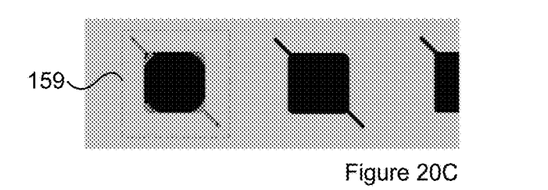

FIGS. 20A-C illustrates inserting a seed pod 152 into a pocket 150 of the annular insert 148. The pocket 150 may comprise a greater interior cross section as compared to that of the entrance thereof.

Whereas the seed pod 152 may have dimensions greater than that of the opening of the pocket 150, the adjacent slits 151 may allow the opening of the pocket 150 to expand to accept the seed pod 152 therein.

Once held within the pocket 150 as shown in FIG. 20B, the seed pod 152 dimensions may exceed those of the opening 150 yet be held within the larger interior of the pocket 150.

Furthermore, as the fibrous material 153 is wet, it may expand further within the interior of the pocket 150 in the manner shown in FIG. 20C.

In embodiments, the insert 148 may indicate various growing regions and wherein the insert 148 is keyed such that it can only be inserted into the drum 101 in a particular orientation or alternatively the orientation thereof is able to be detected when inserted into the drum 101.

Once located within the drum 100 and one in this way, the controller 122 may then control the supply of light (by controlling the longitudinal lighting arrays 127) and water (by controlling the rate of rotation of the drum 101) according to the differing growing regions of the insert 148.

For example, the insert 148 may indicate regions for growing parsley, basil and coriander. As such, when corresponding seedpods 152 are inserted within these regions, the controller 122 is unable to control the lighting and watering of the respective seedpods depending on the recommended watering and lighting for the different types of plants.

In alternative embodiments, each pocket 150 may be numbered and wherein the user may use the interface of the mobile communication device 140 to specify the types of seeds inserted therein. Thereafter, the controller 122 may then control the watering and lighting of the various pockets 150 of the insert 148 depending on the type of plant specified.

In embodiments, each pocket 150 or seed pod 152 may comprise a computer readable media (such as RFID, NFC tag or the like) which is read by a reader of the apparatus 100 to determine the growing region or type of seed pod.

Figure 21:
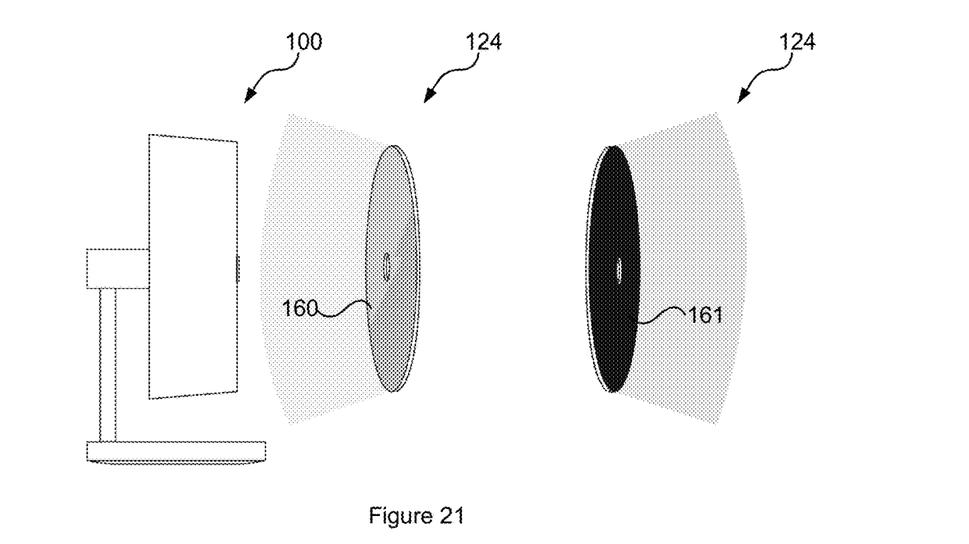
FIG. 21 illustrates light reflecting properties of the cover plate of the apparatus in accordance with an embodiment.

FIG. 21 shows an embodiment wherein the cover plate 124 comprises a reflective inner surface 160 to reflect light back into the interior of the drum 101. The cover plate 124 may comprise a darkened exterior surface 161.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. Hydroponic apparatus comprising a rotary drum rotatably supported at one end from a bearing of a support stand and being accessibly open at an opposite open end by a removeable cover plate, a drive to rotate the rotary drum about the bearing, an axial lamp within the drum, wherein the rotary drum defines an annular watering tank therein and is configured for holding a plurality of plants within an interior thereof in use to be watered by the watering tank whilst the plants are illuminated by the axial lamp.

2. Hydroponic apparatus as claimed in claim 1, wherein the watering tank is replenished via a supply hose from the support stand.

3. Hydroponic apparatus as claimed in claim 2, wherein the watering tank is replenished with water and liquid nutrient from separate supply hoses.

4. Hydroponic apparatus as claimed in claim 1, wherein the apparatus comprises an annular insert insertable within the drum, the annular insert comprising a plurality of pockets for holding seedpods.

5. Hydroponic apparatus as claimed in claim 4, wherein each seedpod comprises a fibrous material comprising seeds therein.

6. Hydroponic apparatus as claimed in claim 5, further comprising a covering through which the seeds germinate.

7. Hydroponic apparatus as claimed in claim 5, further comprising an enclosure having the seed pod therein and having a cover able to be pulled therefrom to expose a growing opening and wherein the enclosure as shaped to fit within a pocket of the annular insert.

8. Hydroponic apparatus as claimed in claim 4, wherein the pocket has an interior of greater cross-sectional than that of an entrance thereof and wherein the seed pod has greater cross-sectional than that of the entrance such that the seedpods are held within the interior.

9. Hydroponic apparatus as claimed in claim 8, wherein the annular insert comprises a flexible material such that the entrance and expand to accommodate the seed pod therethrough.

10. Hydroponic apparatus as claimed in claim 1, further comprising a controller and wherein the controller is configured for controlling the operation of the apparatus according to different interior growing regions within the drum.

11. Hydroponic apparatus as claimed in claim 10, the axial lamp comprises a plurality of longitudinal lighting arrays and wherein the controller is configured for controlling the longitudinal lighting arrays to vary the light at each different interior region.

12. Hydroponic apparatus as claimed in claim 11, wherein the axial lamp remain static with respect to the radial drum and wherein the apparatus further comprises a rotational transducer to detect the rotational orientation of the drum with respect to the axial lamp and wherein the longitudinal lighting arrays are controlled by the controller depending on the rotational orientation of the drum with respect to the axial lamp.

13. Hydroponic apparatus as claimed in claim 10, wherein the annular watering tank is defined between exterior and interior surfaces of the drum such that water therein pools at a lowermost region thereof such that plants therein periodically come into contact with the water at the lowermost region and wherein the controller is configured for variably controlling the rate of rotation of the drum to control the dwell time of the different interior growing regions at the lowermost region.

14. Hydroponic apparatus as claimed in claim 10, wherein the controller is programmed with plant-types according to different interior growing regions and wherein the controller accesses a database of growing requirements of different plant types and wherein the controller is configured for controlling the apparatus according to the growing requirements.

15. Hydroponic apparatus as claimed in claim 10, wherein the apparatus comprises an annular insert insertable within the drum, the annular insert comprising a plurality of pockets for holding seedpods and wherein the annular insert defines the different growing regions.

16. Hydroponic apparatus as claimed in claim 15, wherein the annular insert can only be inserted into the drum at a particular rotational orientation with respect to the drum such that the controller is able to determine the growing regions of the annular insert with respect to the orientation of the drum.

17. Hydroponic apparatus as claimed in claim 15, wherein the annular insert comprises at least one computer readable media which is read by a reader to determine the different growing regions.

18. Hydroponic apparatus as claimed in claim 1, further comprising proximity sensors arranged along the axial lamp configured for detecting growth height of plants within the interior drum in use.

19. Hydroponic apparatus as claimed in claim 18, further comprising a controller in operable communication with a mobile communication device and which causes the mobile communication device to generate an alert according to the growth height of plants.

20. Hydroponic apparatus as claimed in claim 1, wherein comprising at least one interior image sensor and further comprising a controller in operable communication with a mobile communication device and wherein, in use, the image sensors are configured for capturing image data representing a view of an interior of the drum and wherein the mobile communication device is configured for displaying the view of the interior of the drum.

21. Hydroponic apparatus as claimed in claim 20, wherein the controller is configured for capturing successive image data from the at least one interior image sensor in series and stitching together the successive image data to form a 360° view of the interior of the drum.

22. Hydroponic apparatus as claimed in claim 1, further comprising at least one plant health sensor comprising an infrared sensor and further comprising a controller in operable communication with the plant health sensor and wherein, in use, the controller is configured for determining plant health in accordance with data received from the plant health sensor.

23. Hydroponic apparatus as claimed in claim 22, wherein the plant health sensor further comprises an image sensor and wherein the controller or a computing device operably coupled thereto is configured for performing image processing on image data received from the image sensor for determining the plant health.

24. Hydroponic apparatus as claimed in claim 23, wherein the image processing employs a trained machine learning module having been trained on training image and plant health data to recognise plant health using the image data.

25. Hydroponic apparatus as claimed in claim 1, further comprise at least one water quality sensor comprises at least one of dissolved solids (TDS), pH, salinity and temperature sensors and further comprising a controller and of all communication with the at least one water quality sensor and wherein, in use, the water quality sensor is configured for determining water quality in accordance with data received from the at least one water quality sensor.

26. Hydroponic apparatus as claimed in claim 1, wherein the cover plate is translucent and configured for attenuating light from the axial lamp.

27. Hydroponic apparatus as claimed in claim 26, wherein the cover plate is magnetically attachable to the drum.

\* \* \* \* \*